United States Patent
Hyun et al.

(10) Patent No.: US 7,815,702 B2
(45) Date of Patent: Oct. 19, 2010

(54) MULTI CYCLONE COLLECTOR

(75) Inventors: Kie Tak Hyun, Changwon-si (KR);
Young Bok Son, Changwon-si (KR);
Hyoung Joo Cho, Changwon-si (KR);
Kyeong Seon Jeong, Busan (KR)

(73) Assignee: LG Electronics Inc., Seoul (KR)

( * ) Notice: Subject to any disclaimer, the term of this patent is extended or adjusted under 35 U.S.C. 154(b) by 471 days.

(21) Appl. No.: 11/664,410

(22) PCT Filed: Mar. 2, 2005

(86) PCT No.: PCT/KR2005/000562

§ 371 (c)(1),
(2), (4) Date: Feb. 25, 2008

(87) PCT Pub. No.: WO2006/038750

PCT Pub. Date: Apr. 13, 2006

(65) Prior Publication Data

US 2009/0031680 A1    Feb. 5, 2009

(30) Foreign Application Priority Data

Oct. 8, 2004    (KR) .................. 10-2004-0080480

(51) Int. Cl.
*B01D 45/00* (2006.01)
(52) U.S. Cl. .................. 55/343; 55/345; 55/346; 55/337; 55/325; 55/447; 55/429; 55/DIG. 3; 15/352; 15/353

(58) Field of Classification Search ............ 55/343, 55/345, 346, 337, 325, 445–447, 349, 429, 55/DIG. 3; 15/352, 353
See application file for complete search history.

(56) References Cited

U.S. PATENT DOCUMENTS

| | | | |
|---|---|---|---|
| 2,511,387 A | 6/1950 | Watson et al. | 209/144 |
| 4,148,721 A | 4/1979 | Brown et al. | 209/211 |
| 6,746,500 B1* | 6/2004 | Park et al. | 55/343 |
| 7,273,506 B2* | 9/2007 | Oh et al. | 55/343 |
| 2003/0106182 A1* | 6/2003 | Lee | 15/353 |
| 2005/0251951 A1* | 11/2005 | Oh et al. | 15/353 |
| 2005/0252179 A1* | 11/2005 | Oh et al. | 55/337 |
| 2005/0252180 A1* | 11/2005 | Oh et al. | 55/345 |

FOREIGN PATENT DOCUMENTS

| | | |
|---|---|---|
| GB | 1 207 034 A | 9/1970 |
| GB | 1207034 | 9/1970 |
| SU | 453194 A1 | 12/1974 |
| SU | 766653 A1 | 9/1980 |

(Continued)

OTHER PUBLICATIONS

Russian Decision on Grant dated Mar. 3, 2009.

(Continued)

*Primary Examiner*—Jason M Greene
*Assistant Examiner*—Dung Bui
(74) *Attorney, Agent, or Firm*—KED & Associates, LLP

(57) ABSTRACT

A multi cyclone collector with an improved structure is disclosed for providing the highest number of second cyclone collector (300) by disposing a plurality of second cyclone collector (300) in a non circular shape (400) arrangement along a first cyclone collector, thereby increasing collecting efficiency.

13 Claims, 5 Drawing Sheets

FOREIGN PATENT DOCUMENTS

| | | |
|---|---|---|
| SU | 1655578 | 6/1991 |
| SU | 1655578 A1 | 6/1991 |
| WO | WO 01/60524 | 8/2001 |
| WO | WO 02/067757 | 9/2002 |
| WO | WO 02/069778 | 9/2002 |
| WO | WO 2006/038750 | 4/2006 |

OTHER PUBLICATIONS

International Search Report dated Jun. 24, 2005.
Australian Notice of Allowance dated Jan. 9, 2009.
Russian Office Action dated Jun. 19, 2008.

* cited by examiner

MULTI CYCLONE COLLECTOR

TECHNICAL FIELD

The present invention relates to a multi cyclone collector, and more particularly, to, of a first cyclone collector for separating dust firstly and a plurality of second cyclone collectors for separating the dust secondly, an arrangement of the plurality of second cyclone collectors.

BACKGROUND ART

In general, a cyclone collector is a device for collecting dust particle (hereinafter, referred to as "dust") contained in air using a cyclone principle, and normally applied to a vacuum cleaner.

Recently, a multi cyclone collector having a plurality of cyclone collectors connected thereto is used for increasing collecting efficiency. An example of the multi cyclone collector is in a Japanese laid open utility model NO. S52-14775.

Referring to FIGS. 1 and 2, a conventional multi cyclone collector will be described. The multi cyclone collector includes a cyclone (hereinafter, referred to as "a first cyclone collector 1") for collecting dust being relatively large in size by sucking up contaminated air from outside, and a cyclone (hereinafter, referred to as "a second cyclone collector 3") connected with the first cyclone collector 1 to collect dust being relatively small in size. The plurality of second cyclone collectors 3 in the multi cyclone collector is a collection of a plurality of small cyclones, which will be described in more detail as follows.

First, the first cyclone collector 1 includes a first inlet 11, a first body 12, and a first outlet 14. In this instance, the first inlet 11 is connected with a circumferential surface of the first body 12 such that outside air is flowed there into in a tangential direction, and the first outlet 14 is provided at about a central portion in the first body 12 along a perpendicular direction. The first outlet 14 provided at about the central portion in the first body 12 plays a role of discharging air into the second cyclone collector 3, the air from which dust are filtered. The first outlet 14 is formed in a cylindrical shape, a bottom 14b is opened, and a circumference of a top 14a is closed. In some cases, a filter 16 is provided at an opening of the bottom 14b as shown in FIG. 2 which is appended.

Meanwhile, the second cyclone collector 3 is a plurality of small cyclones provided in a circular arrangement along a circumference of the first body 14 included in the first cyclone collector 1. The second cyclone collector 3 includes a second body 32, a second inlet 31, and a second outlet 34.

The second body 32 is formed in a conic shape which is narrowed down toward a bottom thereof, and a collecting container 4 provided at a lower part of the second cyclone collector 3 for collecting dust separated from the air flowing in the second body 32.

In this case, the collecting container 4 is a pipe formed in a circular shape when seen from a plain view, and communicated with each of the second cyclone collector 3 so as to be used with the second cyclone collector 3.

A buffering chamber 56 is formed between the first cyclone collector 1 and the second cyclone collector 3 such that air from the first cyclone collector 1 is passed through the buffering chamber 56 and flowed into the second cyclone collector 3.

A discharging chamber 52 communicated with the second outlet 14 is provided at an upper part of the second cyclone collector 3, and air is passed through the discharging chamber 52 and discharged through a discharging pipe 54. A drawing reference number 5 which is unexplained indicates a case for accommodating the first cyclone collector 1 and the second cyclone collector 3.

Operation of the conventional multi cyclone collector will be described in the following. When the multi cyclone collector is operated and, for example, a suction fan (not shown) of a vacuum cleaner is driven, contaminated outside air is flowed into a first cyclone collector 1 through a first inlet 11 of the first cyclone dust collector 1. In this instance, the contaminated air flowed in is flowed in along a tangential direction to the first cyclone collector, and circulated along an inner wall of a first body 12 of the first cyclone collector 1. In this process, air and dust are separated from each other by a centrifugal force. In this instance, relatively large and heavy dust are collected at a lower part of the first cyclone collector 1, and minute dust which are not separated yet are circulated in the first cyclone collector 1 and joined in the flow of discharged air so as to be discharged through the first outlet 14.

Meanwhile, air including minute dust and discharged from the first cyclone collector 1 is flowed respectively into each of the second body 32 through the second inlet 31, the second body 32 including the second cyclone collectors 3.

Accordingly, the minute dust are separated once again in the second cyclone collectors 3, and purified air is sequentially passed through a second outlet 34, a discharging chamber 52, and a discharging pipe 54 and then discharged to an outside thereof.

In this instance, minute dust separated from air while passing through the inside of the second body 32 of the second cyclone collector 3 are fallen to a lower part of the second body 32 and then collected in the collecting container 4 provided at a lower part of the second cyclone collector 3.

A total size of the conventional multi cyclone collector mentioned above is however limited because a space for installing the multi cyclone collector is limited in a vacuum cleaner. Therefore, the number of the second cyclone collector 3 also needs to be limited.

Particularly, unless a total size of the multi cyclone collector is increased in a width direction, it is unable to increase the number of the second cyclone collector 3 because the second cyclone collector 3 is disposed in a circular shape along an outer circumference of the first cyclone collector 1.

Accordingly, there is a problem that minute dust are not collected in the second cyclone collector 2 to the highest degree, and a part of minute dust is discharged through the discharging pipe 54 to a space having a suction fan (not shown) of the vacuum cleaner, the minute dust not separated at the first cyclone collector 1.

The conventional multi cyclone collector is formed in circular shape if seen in a plain view. Inner space of a vacuum cleaner having a conventional multi cyclone collector is formed in a many sided shape having predetermined edges, and a case 5 is also formed in a many sided shape to be provided in the space. In this regard, the edge portion in the case 5 exists only as an empty space, thereby raising a problem of space waste.

DISCLOSURE OF INVENTION

Accordingly, the present invention is directed to a multi cyclone collector that substantially obviates one or more problems due to limitations and disadvantages of the related art.

An object of the present invention is to provide a multi cyclone collector with an improved structure for enabling to provide a maximum number of second cyclone collectors by improving an arrangement structure of each of the second cyclone collector.

To achieve these objects and other advantages and in accordance with the purpose of the invention, as embodied and broadly described herein, a multi cyclone collector includes a first cyclone collector for drawing in outside air and collecting dust firstly; a second cyclone collector provided in a non circular shape arrangement along an outer circumference of the first cyclone collector so as to collect minute dust contained in air from which dust are separated by the first cyclone collector firstly; a collecting container for collecting minute dust separated from air by the second cyclone collector; and a case for accommodating the first and second cyclone collectors.

The case is formed in a polygonal shape having at least two edges, and the plurality of second cyclone collectors is disposed in the polygonal shape along an inner wall of the case.

The collecting container is formed in a non circular shape same as a non circular arrangement of each of the plurality of second cyclone collectors when seen from a plain view.

A multi cyclone collector in accordance with an embodiment of the present invention has an improved arrangement structure of each of second cyclone collector when seen from a plain view such that number of the second cyclone collector is increased and thus collecting efficiency is increased as much as the increased number of the second cyclone collector.

Corresponding to the arrangement structure of each of the second cyclone collector, the collecting container is formed in a polygonal shape having at least two edges and thus a collecting space is increased as much as the number of the edges.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
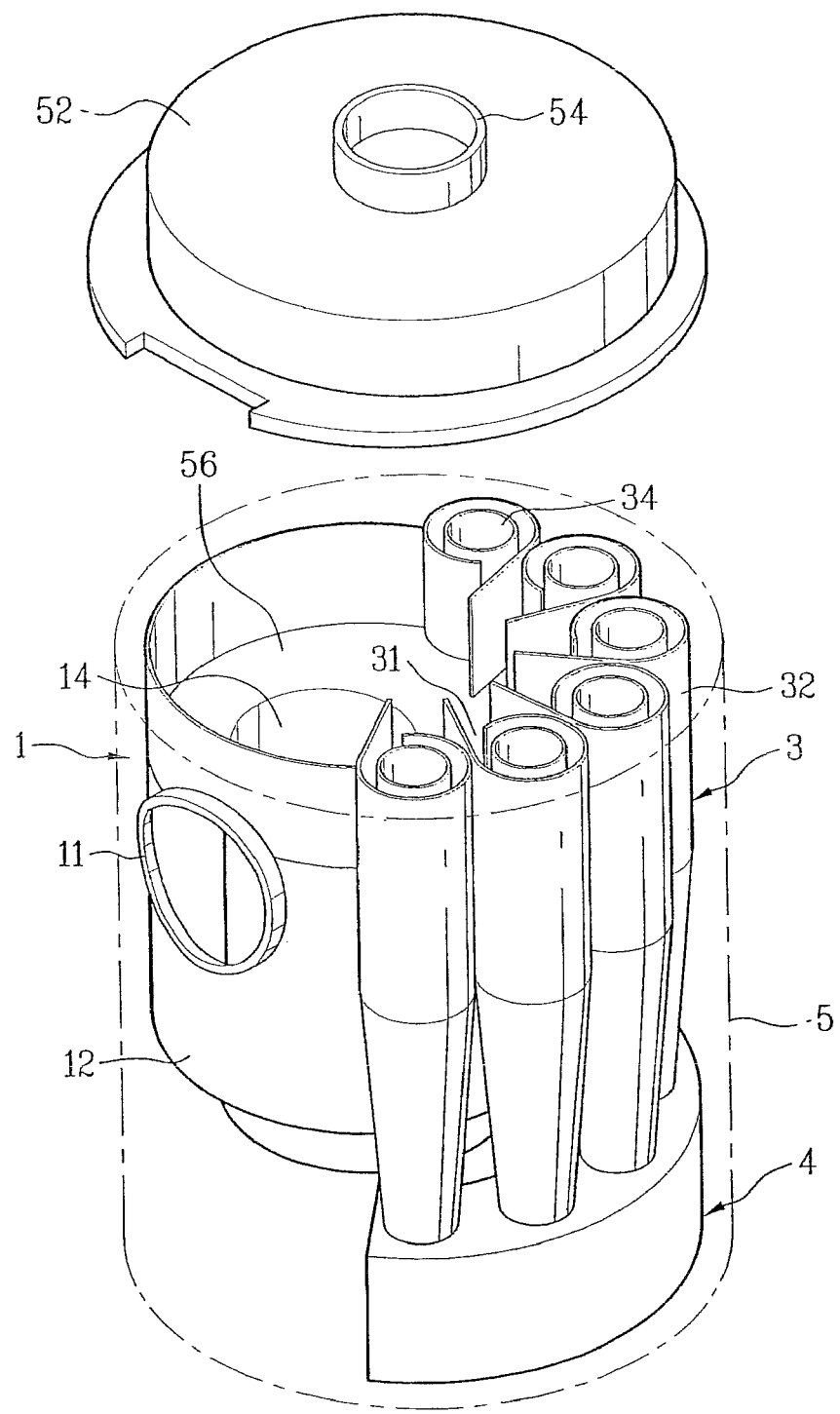
FIG. 1 illustrates a perspective view showing a conventional multi cyclone collector.
Figure 2:
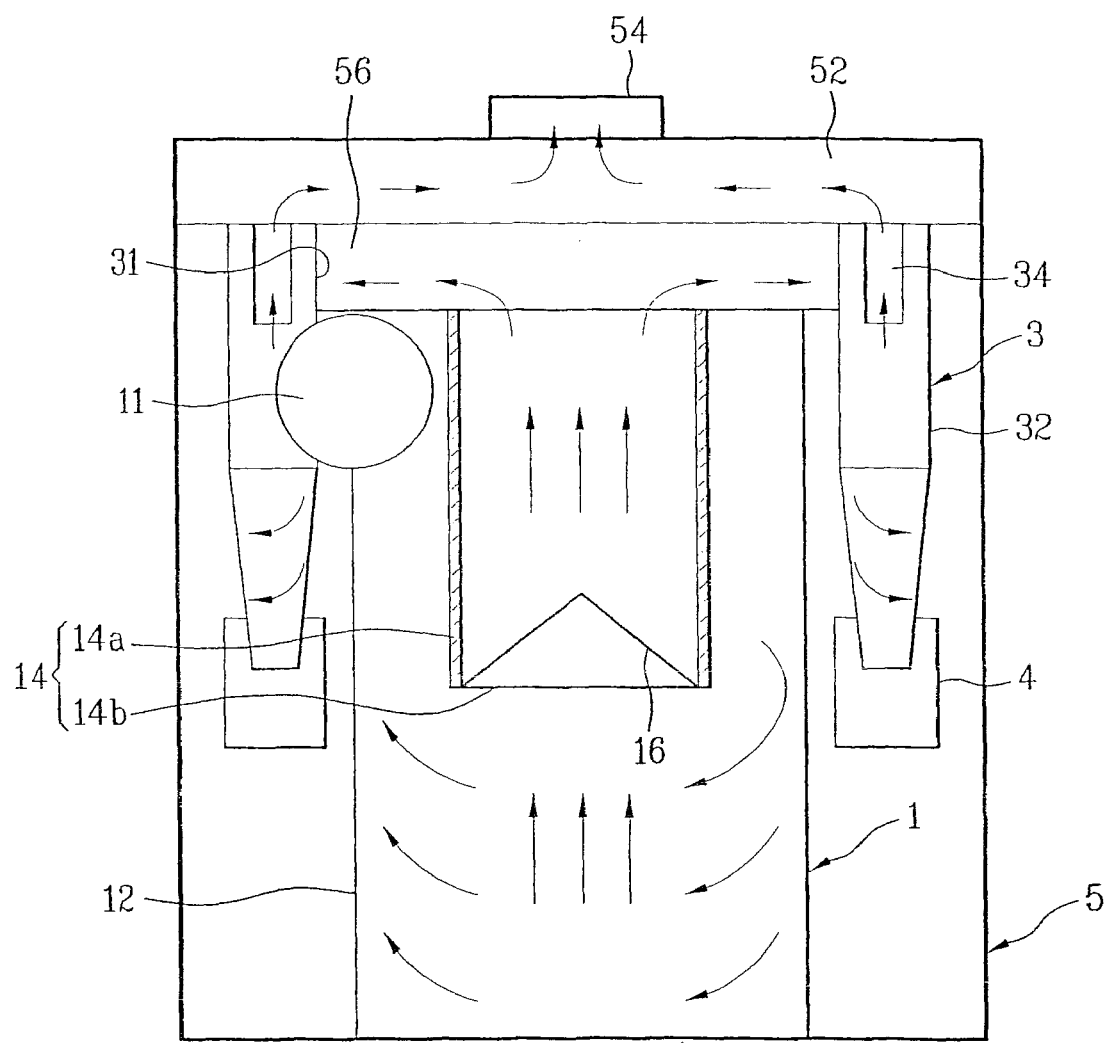
FIG. 2 illustrates a longitudinal section view showing an assembled state of the conventional multi cyclone collector.
Figure 3:
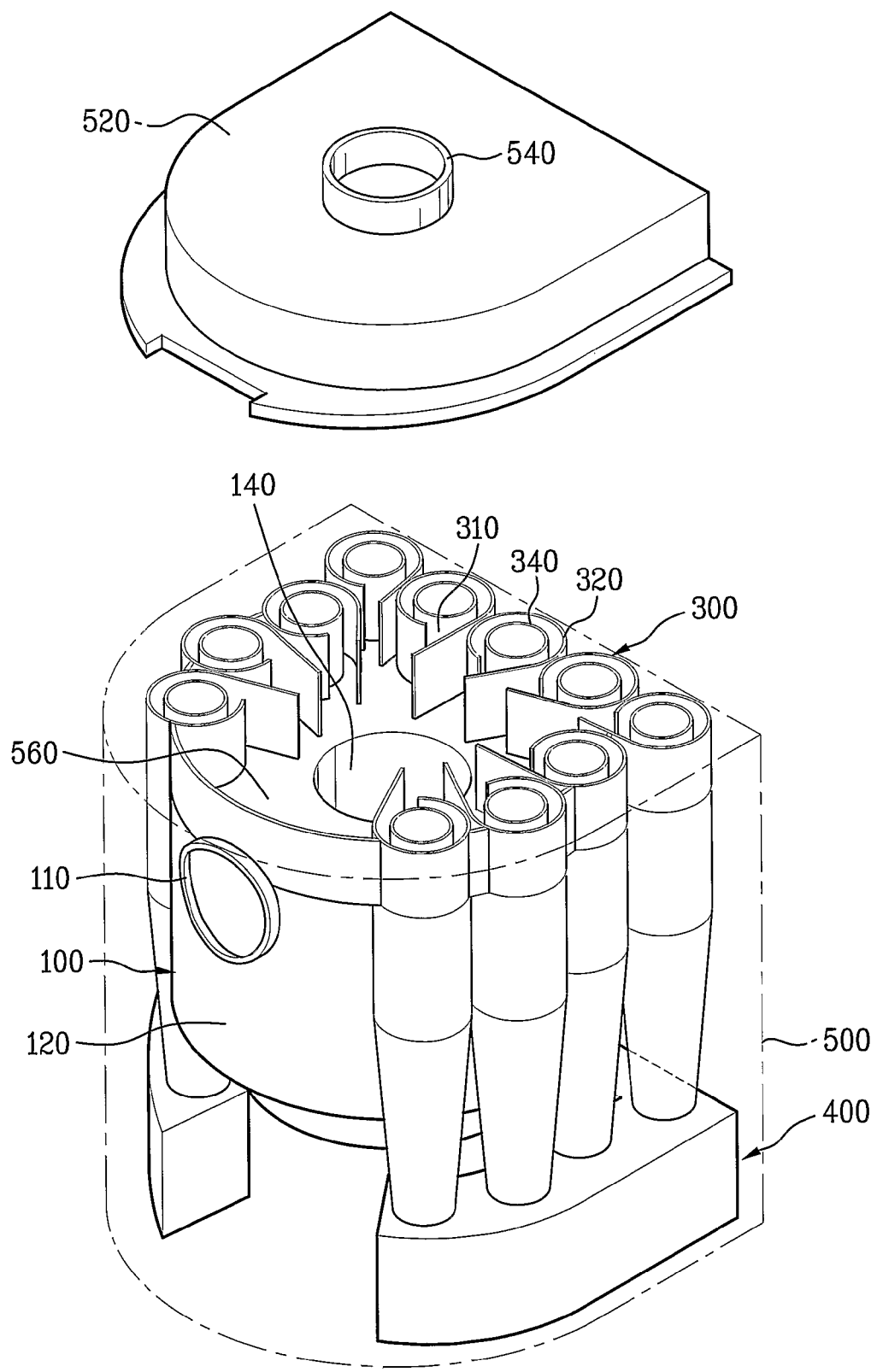
FIG. 3 illustrates a perspective view showing a multi cyclone collector in accordance with an embodiment of the present invention.
Figure 4:
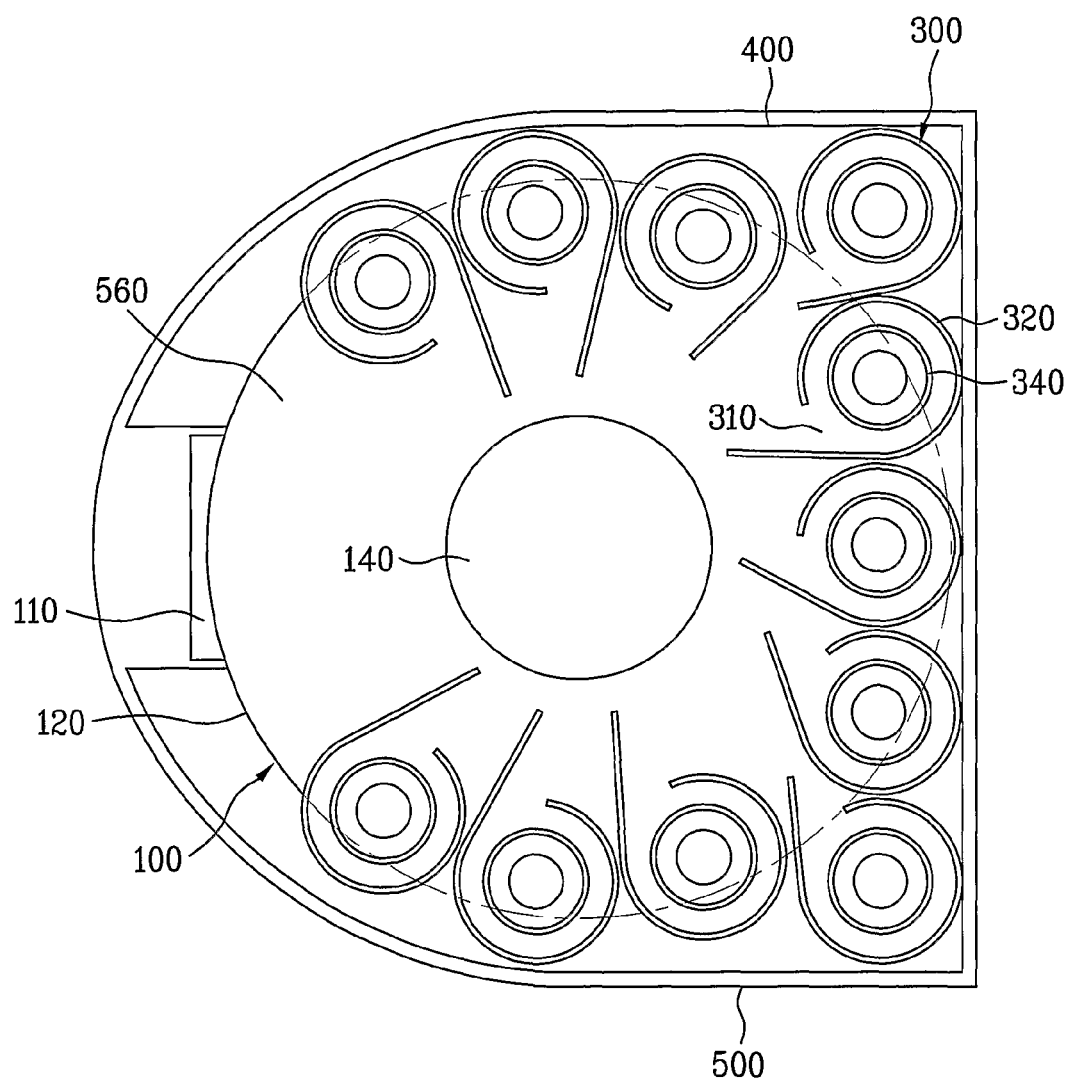
FIG. 4 illustrates a cross section view showing an arrangement of a first embodiment of the second cyclone collector in the multi cyclone collector in accordance with the embodiment of the present invention.
Figure 5:
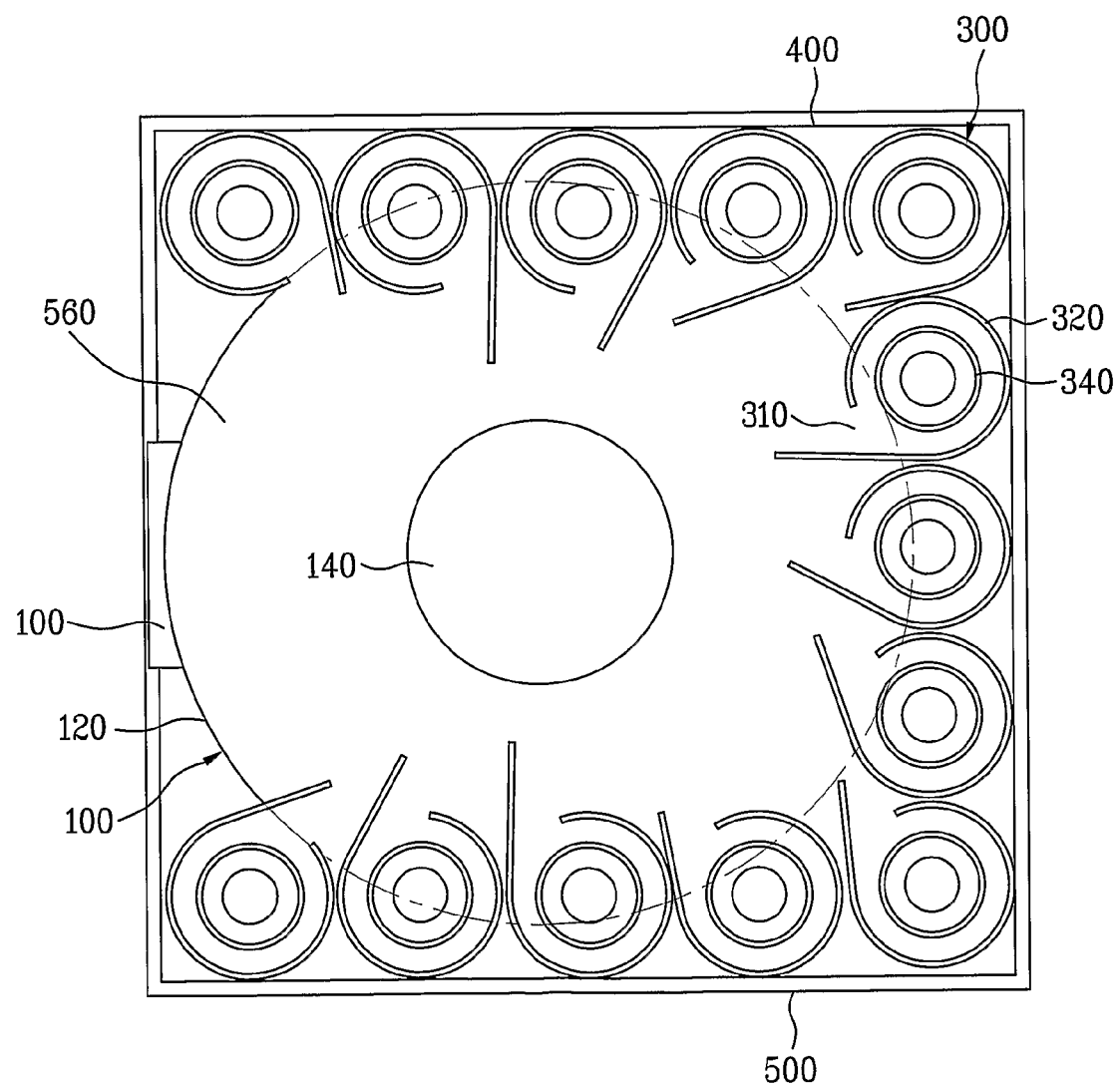
FIG. 5 illustrates a cross section view showing an arrangement of a second embodiment of the second cyclone collector in the multi cyclone collector in accordance with the embodiment of the present invention.

Hereinafter, each embodiment of the present invention will be described with reference to appended drawings as follows. First, FIGS. 3 and 4 illustrate a multi cyclone collector in accordance with an embodiment of the present invention. In other words, the multi cyclone collector in accordance with the embodiment of the present invention includes a first cyclone collector 100, a plurality of second cyclone collectors 300, a collecting container 400, and a case 500.

The first cyclone collector 100 is configured to suck up outside air, to separate dust from the outside air firstly, and to collect the dust.

The plurality of second cyclone collectors 300 is configured to separate minute dust from air secondly, the air from which dust are separated by the first cyclone collector 100 firstly, and then to collect the separated dust. The plurality of second cyclone collectors 300 is provided at a circumference of the first cyclone collector 100.

The collecting container 400 is a can for collecting minute dust separated from air by each of the plurality of second cyclone collectors 300.

The case 500 forms an exterior of the multi cyclone collector.

In this instance, the case 500 is formed to accommodate the first cyclone collector 100, the plurality of second cyclone collectors 300, and the collecting container 400, and to have at least one edge portion.

Particularly, the case 500 is desirably formed in a polygonal shape having at least two edges. The case 500 in accordance with a preferred embodiment of the present invention is a polygon having two edges.

In other words, as shown in FIGS. 3 and 4, the case 500 has two edges at a rear side thereof, and formed in a circular shape, the rear side being opposite to a side through which outside air is flowed in.

Meanwhile, shapes of the first cyclone collector 100 and each of the plurality of second cyclone collectors 300 are respectively same as those shapes of conventional first and second cyclone collectors 100 and 300.

In other words, the first cyclone collector 100 includes a first inlet 110 for flowing outside air, a first body 120, and a first outlet 140 for discharging air from which dust are separated firstly.

Each of the second cyclone collectors 300 includes a second inlet 310 for flowing air discharged through the first outlet 140, a second body 320, and a second outlet 340 for discharging air from which dust are separated secondly.

In this case, the second cyclone collector 300 is smaller than the first cyclone collector 100, and is larger in number. Each of the second cyclone collector 300 is disposed in a non circular shape along an outer circumference of the first cyclone collector 100.

Particularly, in order to maximize the number of the plurality of second cyclone collectors 300 in a limited space, a part of the second cyclone collector 300 is desirably disposed in a circular shape along the outer circumference of the first cyclone collector 100, and the other part is desirably disposed at two edges of the case 500 so as to be formed in a non circular shape as a whole.

In other words, a empty space generated when each of the second cyclone collector 300 is disposed is controlled to be positioned at two edges of the case 500, and an additional second cyclone collector 300 is provided at a corresponding edge portion so as to maximize the number of the second cyclone collector 300.

When the case 500 is formed in a polygonal shape having more than three sides (for example, a tetragonal shape), each of the second cyclone collector 300 may be regularly disposed along the whole inner wall except any one portion of the case 500.

In this instance, the one portion is a portion through which outside air is flown into the first cyclone collector 100, which may be a whole surface or a partial portion of one surface of the case 500.

Each of the second cyclone collector is desirably disposed corresponding to the shape of the case 500 without having the one surface that is the surface having the first inlet 110 positioned thereon for flowing outside air into the first cyclone collector 100.

Particularly, in the present embodiment of the present invention, the portion through which outside air is flowed into the first cyclone collector 100, and which has the first inlet 110 is formed on a surface except one edge portion among each portion of the case 500.

The structure is for minimizing an airflow channel by minimizing a length of the first inlet 110 because when the airflow channel is reduced in size, suction efficiency is increased, and thus collecting efficiency is increased.

The collecting container 400 is provided along a lower part of each of the second body 320 of each of the second cyclone collector 300, and desirably formed in a non circular shape from a plain view, the non circular shape same as the non circular shape arrangement of each of the second cyclone collector 300, so as to obtain a maximum collecting space by forming the shape of the collecting container 400 according to the shape of an inner wall of the case 500.

Particularly, the collecting container 400 is desirably formed in a pipe form, an inside of which being communicated as a whole, so as to collect minute dust all together, the minute dust separated from air by each of the second cyclone collector 300.

Operation of the embodiment of a multi cyclone collector in accordance with the present invention will be described as follows. First, when the multi cyclone collector is driven and a suction generating means such as a suction fan (not shown) of a vacuum cleaner is driven, outside polluted air is flowed into a first cyclone collector 100 through a first inlet 110 of the first cyclone collector 100.

In this instance, outside polluted air flowed in through the first inlet 110 is sucked up along a tangential direction of a first body 120, and circulated along an inner wall of the first body 120. In this process, dusts are separated from air by centrifugal force.

Accordingly, relatively large and heavy sized dust separated from the air are collected in a lower part of the first cyclone collector 100, and minute dust remaining in the air is circulated in the first body 120 and raised up to be discharged through the first outlet 140.

Meanwhile, air including minute dust and discharged from the first cyclone collector 100 is sequentially passed a buffering chamber 560 and a second inlet 310 and flowed into a second body 320 including each of the cyclone collectors 300.

Accordingly, minute dust are separated once again in a plurality of second cyclone collectors 300, and purified air is discharged through a second outlet 340, a discharging chamber 520, and a discharging pipe 540 to an outside thereof.

Minute dust circulated in the second body 320 of the second cyclone collector 300 is fallen to a lower part of the second body 320 and then collected in the collecting container 400 provided at a lower part of each of the plurality of the second cyclone collectors 300.

Meanwhile, the multi cyclone collector in accordance with the present invention is capable of being installed in a canister type vacuum cleaner and in a perpendicular type cleaner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

A multi cyclone collector in accordance with the present invention is available for an industrial use because of the following reasons. A multi cyclone collector includes a plurality of second cyclone collectors each with an improved arrangement such that number of the second cyclone collector is increased. Accordingly, efficiency of collecting minute dust is increased as much as the number of the second cyclone collector.

Furthermore, according to the arrangement of each of the plurality of second cyclone collectors, a collecting container is formed in a many sided shape having at least two edges and thus a collecting space is increased as much as the number of the edges.

What is claimed is:

1. A multi cyclone collector, comprising:
   a first cyclone collector that draws in external air and separates and collects a plurality of first particles from the external air;
   a plurality of second cyclone collectors arranged in fluid communication with the first cyclone collector so as to receive air from which the plurality of first particles has been separated by the first cyclone collector, and to separate and collect a plurality of second particles from the received air;
   a collecting container that collects the plurality of second particles separated by the plurality of second cyclone collectors; and
   a case in which the first and plurality of second cyclone collectors are received, wherein the case is formed in a polygonal shape having at least one interior corner formed by two adjacent vertical walls, wherein some of the plurality of second cyclone collectors are positioned in a circular arrangement along an outer circumferential portion of the first cyclone collector, and a remainder of the plurality of second cyclone collectors are positioned in a non-circular arrangement at the at least one interior corner and along one of the two adjacent vertical walls of the case such that a distance between the first cyclone collector and a second cyclone collector positioned at the at least one interior corner is greater than a distance between the first cyclone collector and a second cyclone collector arranged along the outer circumferential portion of the first cyclone collector.

2. The multi cyclone collector of claim 1, wherein the at least one interior corner of the case comprises two interior corners, with one of the two vertical walls extending therebetween such that the remainder of the plurality of cyclones are arranged along the one of the two vertical walls.

3. The multi cyclone collector of claim 2, wherein the one of the two vertical walls of the case is positioned at a rear side of the case that is opposite to a side thereof through which external air flows in, and wherein the side through which external air flows in has a semi-circular shape.

4. The multi cyclone collector of claim 1, wherein the case has a rectangular horizontal cross section, and wherein the plurality of second cyclone collectors are positioned along an interior surface of the case.

5. The multi cyclone collector of claim 4, wherein the plurality of second cyclone collectors are positioned along three of four interior walls surfaces of the case, and wherein the fourth interior wall surface of the case corresponds to a side of the first cyclone collector through which external air is received.

6. The multi cyclone collector of claim 1, wherein a shape of the collecting container corresponds to an arrangement of the plurality of second cyclone collectors.

7. The multi cyclone collector of claim 1, wherein a size of the plurality of first particles is greater than a size of the plurality of second particles.

8. The multi cyclone collector of claim 1, wherein the first cyclone collector and the plurality of second cyclone collectors have a substantially circular horizontal cross section, and wherein a distance between a center of the first cyclone collector and a center of the second cyclone collector positioned at the at least one interior corner is greater than a distance between the center of the first cyclone collector and a center of the second cyclone collector arranged along the outer circumferential portion of the first cyclone collector.

9. The multi cyclone collector of claim 1, wherein the plurality of second cyclone collectors comprises more than three second cyclone collectors.

10. The multi cyclone collector of claim 9, wherein the more than three second cyclone collectors are arranged along three side sections of the first cyclone collector.

11. A multi cyclone collector, comprising:
a casing;
a first cyclone collector positioned in the casing, the first cyclone collector comprising:
a substantially cylindrical first body;
a first inlet formed in a side wall portion of the first body so as to introduce external air tangentially into the first body and separate particles from the external air; and
a first outlet formed in a top wall of the first body so as to discharge the particle separated air into a buffering chamber; and
a plurality of second cyclone collectors positioned in the casing and arranged along an outer periphery of the first body of the first cyclone collector so as to receive particle separated air from the first cyclone collector via the buffering chamber and further separate particles from the received air, wherein the plurality of second cyclone collectors comprises:
a first plurality of second cyclone collectors positioned along a first arcuate portion of the outer periphery of the first body of the first cyclone collector, in an arrangement corresponding to the arcuate shape of the first arcuate portion of the outer periphery of the first body;
a second plurality of second cyclone collectors positioned along a second arcuate portion of the outer periphery of the first body of the first cyclone collector, in an arrangement corresponding to the arcuate shape of the second arcuate portion of the outer periphery of the first body; and
a third plurality of second cyclone collectors arranged substantially linearly so as to correspond to a rear wall of the casing, at least some of the third plurality of second cyclone collectors overlapping a third arcuate portion of the outer periphery of the first body of the first cyclone collector.

12. The multi cyclone collector of claim 11, each of the plurality of second cyclone collectors comprising:
a second body that extends downward along an outer cylindrical side wall of the first body of the first cyclone collector;
a second inlet positioned at the top wall of the first body and facing the buffering chamber;
a conical bottom portion; and
a cylindrical middle portion connecting the second inlet and the conical bottom portion.

13. The multi cyclone collector of claim 12, further comprising a collecting container positioned at the bottom of the casing, wherein the conical bottom portion of each of the second cyclone collectors is coupled to the collecting container such that a shape of the collecting container corresponds to an arrangement of the plurality of second cyclone collectors so as to direct particles separated from air flowing therein into the collecting container.

* * * * *